(12) United States Patent
Trezza et al.

(10) Patent No.: US 6,771,860 B2
(45) Date of Patent: Aug. 3, 2004

(54) MODULE MOUNTED ALIGNING OPTICAL CONNECTOR

(75) Inventors: John Trezza, Nashua, NH (US); Keith Kang, Hollis, NH (US)

(73) Assignee: Xanoptix, Inc., Merrimack, NH (US)

( * ) Notice: Subject to any disclaimer, the term of this patent is extended or adjusted under 35 U.S.C. 154(b) by 0 days.

(21) Appl. No.: 10/183,495

(22) Filed: Jun. 27, 2002

(65) Prior Publication Data

US 2003/0059173 A1 Mar. 27, 2003

Related U.S. Application Data

(60) Provisional application No. 60/302,240, filed on Jun. 29, 2001.

(51) Int. Cl.$^7$ .............................. G02B 6/26; G02B 6/42
(52) U.S. Cl. ........................................... 385/52; 385/89
(58) Field of Search .............................. 385/92, 88, 89, 385/82, 83, 52, 14, 33, 49, 93, 94, 90

(56) References Cited

U.S. PATENT DOCUMENTS

| | | | |
|---|---|---|---|
| 4,966,432 A | | 10/1990 | Okada et al. |
| 5,091,991 A | * | 2/1992 | Briggs et al. ................. 385/92 |
| 5,175,928 A | | 1/1993 | Grabbe |
| 5,379,361 A | | 1/1995 | Maekawa et al. |
| 5,473,716 A | | 12/1995 | Lebby et al. |
| 5,579,426 A | | 11/1996 | Li et al. |
| 5,664,039 A | | 9/1997 | Grinderslev et al. |
| 5,761,350 A | | 6/1998 | Koh |
| 6,056,448 A | * | 5/2000 | Sauter et al. ................. 385/92 |
| 6,174,424 B1 | | 1/2001 | Wach et al. |
| 6,292,529 B1 | | 9/2001 | Marcovici et al. |
| 6,318,909 B1 | * | 11/2001 | Giboney et al. ............... 385/90 |
| 6,328,482 B1 | | 12/2001 | Jian |
| 6,356,686 B1 | * | 3/2002 | Kuczynski ................... 385/92 |
| 6,374,004 B1 | | 4/2002 | Han et al. |
| 6,406,195 B1 | * | 6/2002 | Hammond et al. ........... 385/88 |
| 2001/0051026 A1 | | 12/2001 | Steinberg et al. |
| 2002/0031313 A1 | | 3/2002 | Williams |

OTHER PUBLICATIONS

International Search Report dated Mar. 28, 2003.
Ayliffe, M.H., "Optomechanical, electrical and thermal packaging of large 2D optoelectronic device arrays for free–space optical interconnects", *SPIE*, vol. 3490, pp. 502–505.
Basavanhally, N.R. et al., "Optoelectronic Packaging of Two–Dimensional Surface Active Devices", *IEEE Transactions On Components, Packaging And Manufacturing Technology—Part B*, vol. 19, No. 1, pp. 107–114, 1996.
Tooley, F., "Challenges in Optically Interconnecting Electronics", *IEEE Journal Of Selected Topics In Quantum Electronics*, vol. 2, No. 1, pp. 3–13, Apr. 1996.
Boisset, G.C. et al., "On–Die Diffractive Alignment Structures for Packaging of Microlens Arrays with 2–D Optoelectronic Device Arrays", *IEEE Photonics Technology Letter*, vol. 8, No. 7, pp. 918–920, Jul. 1996.
Cryan, C.V., "Two–dimensional multimode fibre array for optical interconnects", *IEEE Electroic Letters Online No.* 19980073, Oct. 23, 1997.

(List continued on next page.)

*Primary Examiner*—Javaid H. Nasri
(74) *Attorney, Agent, or Firm*—Morgan & Finnegan, LLP

(57) ABSTRACT

A coupler adapter has a base and at least one alignment feature disposed upon the base. The at least one alignment feature is constructed for aligning a multi-fiber bundle to an opto-electronic module to permit transmission of optical signals between the multi-fiber bundle and optical devices within the opto-electronic module when the opto-electronic module is larger in span than a spacing of alignment elements used in a commercial connector that holds the multi-fiber bundle.

16 Claims, 5 Drawing Sheets

OTHER PUBLICATIONS

Giboney, K.S., "Paraellel–Optical Interconnect Development at HP Laboratories", *SPIE*, vol. 3005, pp. 193–201, Feb. 1997.

Hall, J.P. et al., "Packaging of VCSEL, MC–LED and Detector 2–D Arrays", Electronic Components and Technology Conference, pp. 778–782, 1998.

Hayashi T. and Tsunetsugu H, "Optical Module with MU Connector Interface Using Self–alignment Technique by Solder–bump Chip Bonding", Electronic Components and Technology Conference, p. 13–19, 1996.

Ishida, H. et al., "Two–dimensionally arranged 24–fiber optical connectors", *OFC '97 Technical Digest*, pp. 189–190, 1997.

Jöhnck M. et al., "8X* Pof Based Interchip Interconnection with 2.5 Gbit/s Per Channel Data Transmission", ECOC '98, pp. 35 and 36, Sep. 20–24, 1998.

Koyabu, K. et al., "Fabrication of Two–Dimensional Fiber Arrays Using Microferrules", *IEEE*, pp. 11–19, 1998.

Lee, S.S., et al., "Self–Aligned Integration of 8 × 1 Micromachined Micro–Fresnel Lens Arrays And 8× 1 Vertical Cavity Surface Emitting Laser Arrays For Free–Space Optical Interconnect", *IEEE*, pp. 31.2.1–31.2.4, 1994.

Liu, Yongsheng et al., "Design, implementation, and characterization of a hybrid optical interconnect for a four–stage free space optical backplane demonstrator", *Applied Optics*, vol. 37, No. 14, pp. 2895–2911, May 10, 1998.

Maj, T. et al., "Interconnection of a two–dimensional array of vertical–cavity surface–emitting lasers to a receiver array by means of a fiber image guide", *Applied Optics*, vol. 39, no. 5, pp. 683–689, Feb. 10, 2000.

McCormick, F.B., "Smart Pixel Optics and Packaging", IEEE/LEOS Summer Topical Meeting: Smart Pickels, pp. 45 and 46, Aug. 1996.

Ohki, A. et al., "Multi–channel optical coupling between a VCSEL arrays and multimode optical fibers for a 40–channel parallel optical interconnection module", *IEEE*, pp. 47 and 48, 1998.

Sasian, J. et al., "Fabrication of Fiber bundle arrays for free–space photonic switching systems", *Optical Engineer*, vol. 33, No. 9, pp. 2979–2985, Sep. 1994.

Söchtig, J. et al., "Replicated Plastic Optical Components for Optical Micro Systems", *IEEE*, pp. 37 and 38, 1998.

* cited by examiner

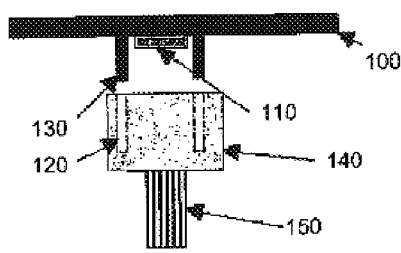 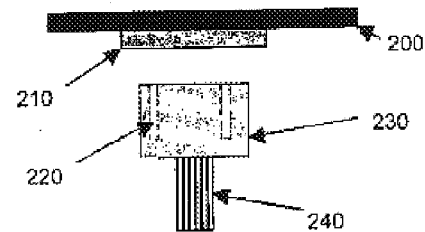
FIG. 1
(PRIOR ART)
FIG. 2

MODULE MOUNTED ALIGNING OPTICAL CONNECTOR

CROSS REFERENCE TO RELATED APPLICATIONS

This application claims priority under 35 USC 119(e)(1) of U.S. Provisional Patent Application Serial No. 60/302,240 filed Jun. 29, 2001.

FIELD OF THE INVENTION

The present invention relates to connectors and, more particularly, to connectors used in fiber optic communication arrangements.

BACKGROUND

Connectors to attach pieces to an opto-electronic module exist, but in all cases, the size of the opto-electronic part chip in the module is smaller than the spacing between the alignment elements, for example, the guide pins used to ensure accurate, reproducible alignment between fibers in the connector and the module.

This prior art arrangement is shown in FIG. 1. A fiber bundle is terminated into a connector which contains a ferrule. The Connector-Ferrule combination performs two functions: It holds the individual fibers very accurately with respect to one another and it holds the multiple fibers, as a group, very accurately with respect to the particular alignment features so that when the connector is plugged into a mating connector (holding additional fibers or on a module), the two connectors align the fibers that are integrated with the first connector with the corresponding features (either fibers or optical or mechanical devices) that are integrated into the second connector.

In order to maintain high accuracy when plugging two connectors together, there are usually two or more alignment features that are spaced apart over some distance. However, to maintain the accuracy of these alignment features with respect to one another, they cannot be separated in space by too great a distance. This is because, when manufacturing parts with extreme accuracy, the manufacturing error in relative placement of the alignment features increases as those features get spaced further apart. Hence, the features need to be spaced far enough that they can control such things as X-Y positioning and rotation in that plane accurately enough, but not so far apart that the accuracy of the placement of those features themselves interfere with the accuracy of the connection.

For purposes of compatibility, the industry currently uses a few standard connectors, for example the MTP® connector (a registered trademark of US Conec Ltd). The MTP connector has two alignment or guide pins spaced 4.6 mm apart. As a result, the size of an opto-electronic part that can be used with this connector is limited by the spacing of the alignment or guide pins.

As time progresses, opto-electronic components or modules have begun to incorporate chips into having more and more optical devices and, in some cases, greater electronic functionality. However, as the numbers of devices and functionality increase, the chips get larger. Thus, the connector can become a limitation on the size of the chip (and hence the number of devices or amount of functionality).

Compounding the problem is the fact that, in modules currently available, the alignment features on the module side are integrated into the module package.

Presently, opto-electronic chips are or will imminently be larger than the spacing of the alignment features on the optical connector. Thus, as shown in FIG. 2, there is a problem with providing alignment features on the module side that meet the spacing criteria necessary to connect to currently available commercial connectors.

One possible solution to the problem is to design a wholly new connector for use with larger chips. However, connector design is expensive and typically outside the business areas of producers of the chips. Moreover, there is no way to guarantee widespread acceptance of such a connector, thereby limiting the market for both the chips and connectors. In addition, it is desirable for such larger chips to nevertheless be compatible with existing connectors, to avoid the problem of widespread rejection due to the inherent obsolescence effect it will have on existing products already in use.

Thus, there is a need for a way for chips larger than the alignment pin spacing to be able to be used with current commercially available connectors.

SUMMARY OF THE INVENTION

We have developed a mechanical connector piece which provides a way to attach a multi-fiber connector to an opto-electronic module when the size of the opto-electronic component (i.e. chip) for the module is larger in a real extent than the spacing of the high precision alignment elements (e.g. guide pins or other alignment features) used in commercial connectors.

The advantages and features described herein are a few of the many advantages and features available from representative embodiments and are presented only to assist in understanding the invention. It should be understood that they are not to be considered limitations on the invention as defined by the claims, or limitations on equivalents to the claims. For instance, some of these advantages are mutually contradictory, in that they cannot be simultaneously present in a single embodiment. Similarly, some advantages are applicable to one aspect of the invention, and inapplicable to others. Thus, this summary of features and advantages should not be considered dispositive in determining equivalence. Additional features and advantages of the invention will become apparent in the following description, from the drawings, and from the claims.

BRIEF DESCRIPTION OF THE DRAWINGS

FIG. 1 shows a connector and module according to the prior art;

FIG. 2 shows the problem that will be encountered when a commercial connector needs to be connected on a module having a chip with a larger area than the spacing of the alignment features of the connector;

DETAILED DESCRIPTION

Figure 3:
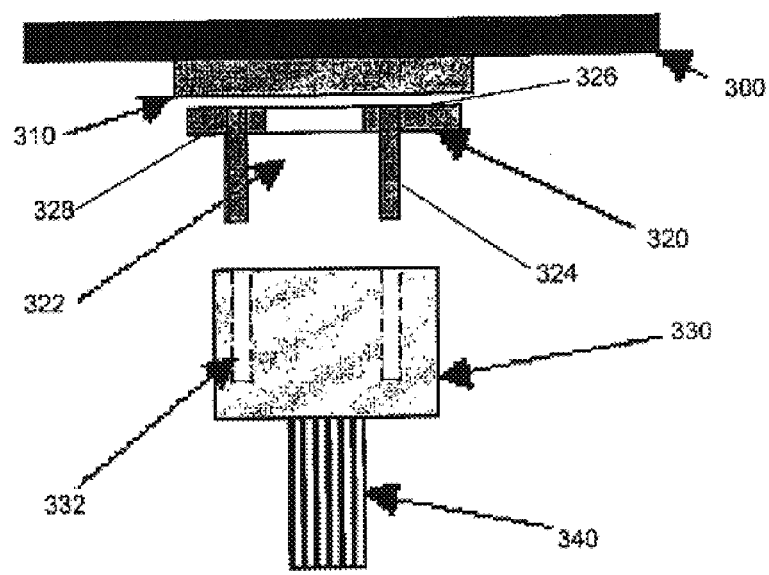
FIG. 3 illustrates a coupler adapter with alignment features placed on optical components and configured to mate with a commercial optical fiber holding the connector.

We have created different variants of a connector usable to attach a fiber bundle in a commercially available connector to an opto-electronic module with high, reproducible accuracy. The connector may be one designed to allow the fiber bundle to be 'plugged-in' just once or could be removable style which could be 'plugged-in' and removed multiple times. A few examples of such known cable styles are the MTP, MPO, MPX, SMC, ST, LC, MT-RJ. While an apparatus constructed according to the teachings herein could be used with any opto-electronic module or connector for such applications, it is particular useful for opto-electronic modules where the chips to which the fibers in a fiber bundle must be mated are larger in lateral and/or vertical extent in a plane containing the spacing features, for example, in the case of guide pins the axes of the guide pins, than the spacing of the alignment features themselves.

Adverting to FIG. 1, optical components 110 of a module package 100 are smaller than the spacing of male alignment features 120 and female alignment features 130. Shown is a prior art arrangement that includes a fiber bundle 150 terminated into a connector 140 which contains a ferrule. In this prior art arrangement, the Connector-Ferrule combination holds individual fibers very accurately with respect to one another and it holds the multiple fibers, as a group, very accurately with respect to the particular alignment features so that when the connector 140 is plugged into a module package 100 having optical components 110, the two connectors align the fibers that are integrated with the first connector with the corresponding features (either fibers or optical or mechanical devices) that are integrated into the module package 100. The module package 100 further include the male alignment features 120 and female alignment features 130 to assist in aligning the fibers. However, in this arrangement there is no interference with the alignment features since the optical components 110 are smaller than the spacing between the alignment features.

FIG. 2 shows the problem encountered when a commercial connector 230 holding fiber bundle 240 needs to be connected on a module 200 that has a chip or optical components 210 with a larger area than the spacing of alignment features 220 of the connector 230.

We have devised at least three approaches that overcome the problem noted above. Moreover, we have recognized that using certain variants of our approaches in some applications will introduce other problems previously unrecognized. However, we have devised other variants which overcome those problems and provide further advantages.

In one example approach in accordance with the teachings of the invention, shown in FIG. 3, we create a coupler adapter 320 that can be placed on top of the optical components 310 of a module package 300 and is configured to mate with a commercial optical fiber holding connector 330 that holds fiber bundle 340. The coupler adapter 320 is designed in such a way that it has alignment features 324 built into it and is constructed to have holes or an optical access window 322 through it that allow optical access to the underlying optical devices. In addition, the coupler adapter 320 may include a base 328, and a securing means 326 generally used in the industry to hold the base to the optical components 310 or the module 300. The optical components 310 and the coupler adapter 320 are designed together in such a way that the portions of the coupler adapter 320 that do not allow light to pass through do not impact the operation of the chip and/or the performance of the module as a whole. This allows use of alignment features 324 and alignment features 332 of connector 330 spaced in a format compatible with high precision connectors while still allowing the optical components to be of an arbitrarily large size.

Figure 4:
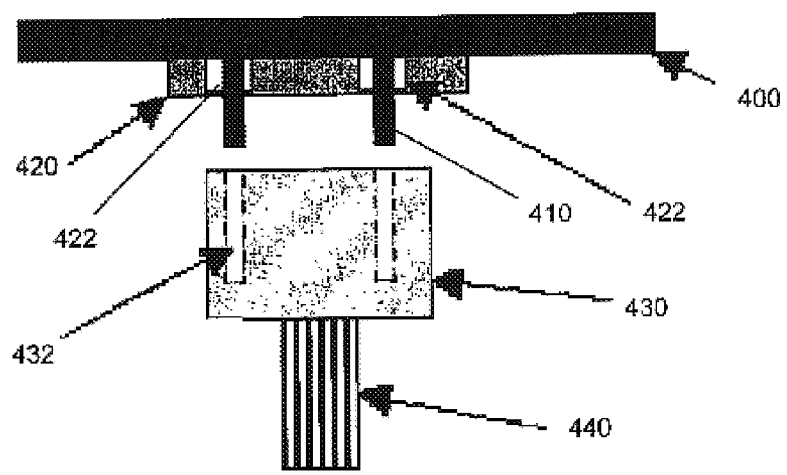
FIG. 4 shows the alignment features of FIG. 3 integrated with the module package.
Figure 5:
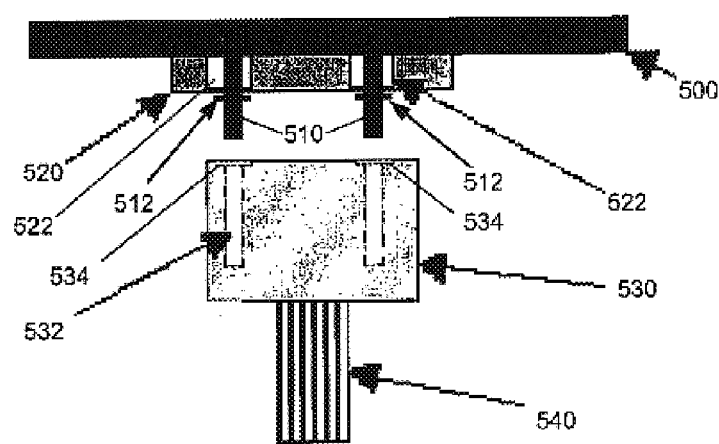
FIG. 5 illustrates the alignment features of FIG. 4 with the addition of stop.

Alternative variants use a simpler approach, such as shown in FIG. 4, that has a substantially lower yield but allows for continuing the practice of having alignment features integrated with a module package 400. In these variants, the chips or optical components 420 are designed so that no components are located at the locations of the alignment features 432 for an area slightly larger than the cross section of the alignment features 432 of connector 430 holding fiber bundles 440. Holes 422 are then etched through the chips or optical components 420 to allow pins 410 to protrude through.

A third option is similar to the first approach except, with the first approach it is possible for the adapter to flex and/or something on the connector to protrude such that something on the inserted connector can potentially impact the devices on the chip in some applications. Thus, the third approach incorporates stops 512 on pins 510 that mate with the alignment features 532 having recess 534 to prevent the connector 530 that holds fiber bundle 540 from being inserted to far. The module package 500 further includes optical components 520 having through holes 522 in the optical components 520.

One advantage of the first and third approach is that forces incurred by the module as a result of the insertion of the connector will be applied to the module via the adapter. Thus, they will be distributed over a larger area and hence produce less mechanical stress on the module.

Figure 6:
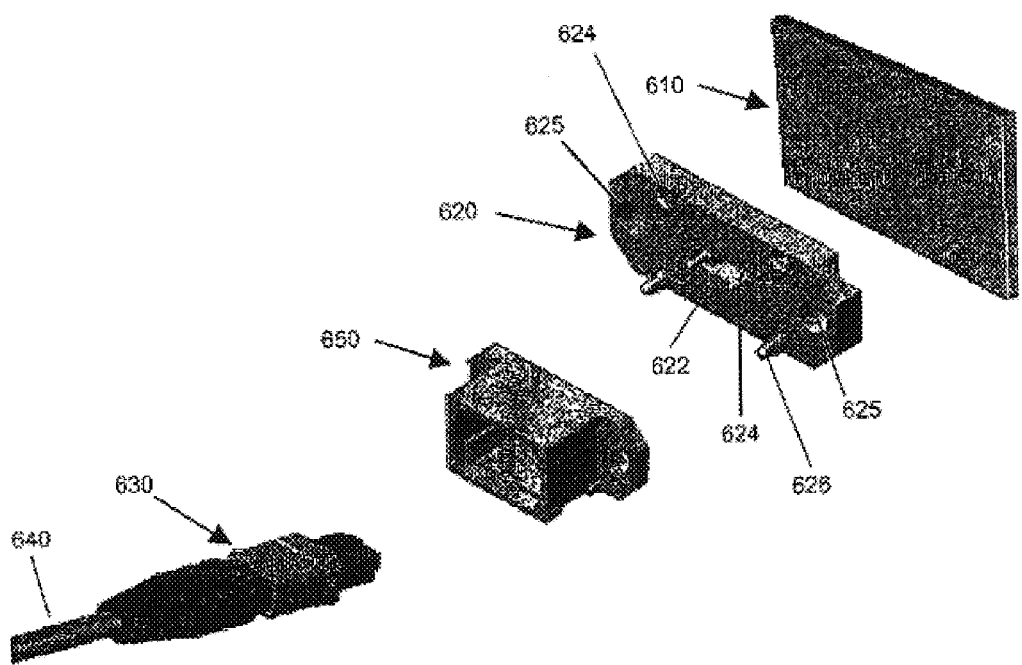
FIG. 6 shows an exploded view of a variant of the coupler adapter in FIG. 3.

FIG. 6 shows a further variant in accordance with the invention in exploded view. As shown in FIG. 6, a complex coupler adapter 620 (having a window 624) that is capable of:

being attached to an optical component module 610, containing the alignment features required for high accuracy and for coupling to a fiber bundle 640, being fused with a coupling element 650 into which a fiber bundle connector 630 would fit, and allowing all of the optical signals from the fiber bundle 640 to interact with all of the optical devices on the optical chip.

As noted above, the coupler adapter 620 piece can be readily made compatible with commercial connectors. As shown, the variant of FIG. 6 is compatible with an MTP-style connector system. It is designed to be ultrasonically welded to the coupler piece of an MTP connector system. It also connects to a ferrule which has either guide pin holes or the pins themselves. That is, it can be readily made with pins 624 included (male), such as shown, or with holes 625 (female). The two configurations allow either style of pin-configured fiber bundles to be used with our coupler adapter. The coupler adapter further may have secondary pins 626 to further assist in the alignment of the fiber bundles.

It should therefore be understood that the above description is only representative of illustrative embodiments. For the convenience of the reader, the above description has focused on a representative sample of all possible embodiments, a sample that teaches the principles of the invention. The description has not attempted to exhaustively enumerate all possible variations. That alternate embodiments may not have been presented for a specific portion of the invention, or that further undescribed alternate embodiments may be available for a portion, is not to be considered a disclaimer of those alternate embodiments. One of ordinary skill will appreciate that many of those undescribed embodiments incorporate the same principles of the invention and others are equivalent.

What is claimed is:

1. A coupler adapter, comprising:

a base, constructed for placement between a multi-fiber bundle bearing commercial connector and an opto-electronic chip of an onto-electronic module; and a pair of alignment features, having a senaration distance, disposed upon the base in a location and configuration for mating with the multi-fiber bundle bearing commercial connector and aligning the multi-fiber bundle bearing commercial connector with the opto-electronic chip through at least one window through in the base, the separation distance being smaller than the opto-electronic chip such that the onto-electronic chip can not fit within the separation distance when optical devices on the opto-electronic chip are properly aligned with the window.

2. The coupler adapter of claim 1, wherein the optical devices further comprise at least one of lasers, detectors or modulators.

3. The coupler adapter of claim 2, wherein the base is attached to the opto-electronic module.

4. The coupler adapter of claim 1, wherein the base further comprises walls defining the at least one window between the multi-fiber bundle and the optical devices.

5. The coupler adapter of claim 4, wherein the commercial connector is an MTP-style connector.

6. The coupler adapter of claim 4, wherein the commercial connector further comprises guide holes and at least one of the pair of the alignment features of the coupler adapter comprises a guide pin.

7. The coupler adapter of claim 1, wherein the opto-electronic chip further includes walls defining through-holes for at least one of the pair of alignment features to protrude through.

8. The coupler adapter of claim 1, wherein at least one of the pair of alignment features further includes a stop feature.

9. The coupler adapter of claim 8, wherein the stop feature is positioned distally with respect to the module.

10. The coupler adapter of claim 8, wherein the coupler adapter is connected to the commercial connector and the stop feature is positioned in the commercial connector and wherein the commercial connector further includes a recess for receiving the stop feature.

11. A coupler adapter for attaching a commercial connector that holds a multi-fiber bundle, comprising:

a base having walls defining at least one hole therethrough;

a module package;

an optical component bearing piece attached between the module package and the base wherein the optional component bearing piece has a lateral span; and a pair of alignment features, disposed on the base and spaced apart by a span smaller than the lateral span, and located to be mated with alignment elements of the commercial connector for aligning the multi-fiber bundle to the optical component to create an optical interconnect and permit transmission of optical signals through the hole to allow the multi-fiber bundle to interact with the optical component when the span and the lateral span are co-linear such that the lateral span of the optical component bearing piece is larger, along a plane perpendicular to the alignment elements, than the spacing of the alignment elements used in the commercial connector.

12. The coupler adapter of claim 11, wherein the alignment feature is mated with a coupling element containing the commercial connector and multi-fiber bundle.

13. The coupler adapter of claim 11, further comprising secondary alignment features.

14. The coupler adapter of claim 13, wherein the secondary alignment features comprise guide pins.

15. The coupler adapter of claim 13, wherein the secondary alignment feature comprise guide holes.

16. The coupler adapter of claim 11, wherein the optical interconnect is a parallel optical interconnect between a PC card and a patch panel.

* * * * *

UNITED STATES PATENT AND TRADEMARK OFFICE
CERTIFICATE OF CORRECTION

PATENT NO.   : 6,771,860 B2  
DATED        : August 3, 2004  
INVENTOR(S)  : John Trezza and Keith Kang It is certified that error appears in the above-identified patent and that said Letters Patent is hereby corrected as shown below:

Column 5,  
Line 1, "senaration" should read -- separation --

Signed and Sealed this

Twenty-first Day of December, 2004

JON W. DUDAS  
*Director of the United States Patent and Trademark Office*